(12) United States Patent
Lee et al.

(10) Patent No.: US 8,810,540 B2
(45) Date of Patent: Aug. 19, 2014

(54) TOUCH MODULE

(71) Applicant: Hannstar Display Corp., New Taipai (TW)

(72) Inventors: Kuo-Sheng Lee, Tainan (TW); Sung-Chun Lin, Tainan (TW); Chien-Ting Chan, Tainan (TW)

(73) Assignee: Hannstar Display Corporation, Taipei (TW)

( * ) Notice: Subject to any disclaimer, the term of this patent is extended or adjusted under 35 U.S.C. 154(b) by 23 days.

(21) Appl. No.: 13/847,335

(22) Filed: Mar. 19, 2013

(65) Prior Publication Data

US 2014/0043257 A1 Feb. 13, 2014

(30) Foreign Application Priority Data

Aug. 8, 2012 (CN) .......................... 2012 1 0279856

(51) Int. Cl.
*G09G 5/00* (2006.01)
*G06F 3/041* (2006.01)

(52) U.S. Cl.
CPC ...... *G06F 3/041* (2013.01); *G06F 2203/04103* (2013.01); *G06F 2203/04107* (2013.01)
USPC ............................................ 345/173; 349/12

(58) Field of Classification Search
CPC ..... G06F 3/0412; G06F 3/0416; G06F 3/041; G06F 2203/04103; G06F 2203/04107
USPC ........................................ 345/173; 349/12, 13
See application file for complete search history.

(56) References Cited

U.S. PATENT DOCUMENTS

| 2004/0080267 A1* | 4/2004 | Cok ............................... 313/512 |
| 2011/0234507 A1* | 9/2011 | Chou et al. ...................... 345/173 |
| 2012/0050173 A1* | 3/2012 | Chou et al. ...................... 345/173 |
| 2013/0038547 A1* | 2/2013 | Lin et al. ........................ 345/173 |

* cited by examiner

*Primary Examiner* — Tom Sheng
(74) *Attorney, Agent, or Firm* — Jianq Chyun IP Office

(57) ABSTRACT

A touch module includes a display module, a touch sensing layer and a protecting substrate. The touch sensing layer includes a shielding part, a hardening layer and a flat layer. The hardening layer has an open slot near the shielding part for separating a portion from another portion of the hardening layer. The touch module will not have uneven surface occurred at stacking and bending positions of the edge of the touch module and can avoid the occurrence of mura phenomenon, so as to enhance the display effect of the touch module. In addition, the flat layer is covered onto the hardening layer and the open slot, so that pattern of the touch sensing layer is mild visually, so as to improve the visual effect of the display of the touch module.

10 Claims, 6 Drawing Sheets

TOUCH MODULE

CROSS-REFERENCE TO RELATED APPLICATION

This application claims the benefit of China Patent Application No. 201210279856.8, filed on Aug. 8, 2012, in the State Intellectual Property Office of the People's Republic of China, the disclosure of which is incorporated herein in its entirety by reference.

FIELD OF THE INVENTION

The present invention relates to a one glass solution (OGS) touch module, in particular to the touch module having an open slot formed at a position near a hardening layer of a shielding part, so that uneven surface will not occur at stacking and bending positions on a side of the hardening layer to avoid the mura phenomenon.

DESCRIPTION OF THE RELATED ART

One-piece touch module is one of the currently emerging touch modules introduced to the market, and the touch module is also known as one glass solution (OGS) or touch on lens (TOL) touch module. The touch module generally comprises a liquid crystal module (LCM), a touch sensing layer and a cover lens. The touch sensing layer is disposed between the liquid crystal module and the cover lens.

With reference to FIG. 1 for a cross-sectional side view of a conventional touch module, the touch module comprises a liquid crystal module 1, a touch sensing layer 2 and a cover lens 3, wherein the touch sensing layer 2 is disposed on the cover lens 3. The liquid crystal module 1 is disposed on the touch sensing layer 2. More specifically, the touch sensing layer 2 comprises a shielding part 21, a conducting part 22, a metal circuit 23, a hardening layer 24 and a bridge layer 25. The shielding part 21 is disposed around the periphery of the touch sensing layer 2, so that the shielding part 21 is disposed at a position near the external side of the touch sensing layer 2. The conducting part 22 is disposed at an interface between the touch sensing layer 2 and the cover lens 3, such that the conducting part 22 is disposed on the cover lens 3. A portion of the conducting part 22 is stacked on the shielding part 21. The metal circuit 23 is disposed on the shielding part 21, and a portion of the metal circuit 23 is stacked with the conducting part 22 of the shielding part 21. The hardening layer 24 is covered onto the shielding part 21, the conducting part 22 and the metal circuit 23. The bridge layer 25 is covered onto the hardening layer 24.

With reference to FIG. 2 for an enlarged schematic view of a stack position on a side of a conventional touch module, the portion of conducting part 22 is stacked onto the shielding part 21, and a portion of metal circuit 23 is stacked onto the conducting part 22 and the hardening layer 24 is covered onto the shielding part 21, the conducting part 22 and the metal circuit 23, and these stacked layers makes the thickness at the stacking and bending position of the side of the touch module too large, so that the hardening layer 24 disposed above the shielding part 21 and the conducting part 22 will have a similarly large inclination due to the too large thickness at the stacking and bending positions, thus resulting in an uneven surface of the hardening layer 24 as shown in the figure. When a light is passed through the touch module, the mura phenomenon occurs, and thus affecting the display effect of the touch module adversely and significantly. In addition, the pattern of the touch sensing layer 2 of the conventional touch module is visually too obvious, so as to affect the display effect of the touch module. Obviously, the conventional touch module requires improvements.

SUMMARY OF THE INVENTION

In view of the shortcomings of the prior art, the inventor of the present invention based on years of experience in the related industry to conduct researches and experiments, and finally designed a touch module to overcome the shortcomings of the prior art.

Therefore, it is a primary objective of the present invention to provide a touch module having an open slot formed on a hardening layer of a shielding part of the touch module.

Another objective of the present invention is to provide a touch module capable of preventing uneven surface formed at stacking and bending positions on a side of the hardening layer and avoiding the mura phenomenon.

A further objective of the present invention is to provide a touch module with mild patterns of a touch sensing layer to enhance the display effect of the touch module.

To achieve the foregoing objectives, the present invention provides a touch module, comprising: a protecting substrate; a touch sensing layer, disposed on the protecting substrate, and comprising a conducting part, a shielding part, a hardening layer and a flat layer, and the shielding part being disposed around the periphery of the touch sensing layer, such that the shielding part is disposed at a position near an external side of the touch sensing layer, and the conducting part being disposed on the protecting substrate, and the hardening layer covering the shielding part and the conducting portion, and the hardening layer having an open slot formed at a position near the shielding part, such that a portion of the hardening layer and another portion of the hardening layer are separated by the open slot, and the open slot being disposed around the periphery of the touch sensing layer, and the open slot being disposed on an internal side of the shielding part, and the flat layer covering the hardening layer and the open slot; and a display module, disposed on the touch sensing layer.

In summation, the present invention provides a touch module, comprising: a protecting substrate; a touch sensing layer, disposed on the protecting substrate, and comprising a conducting part, a shielding part, a hardening layer and a flat layer, and the shielding part being disposed around the periphery of the touch sensing layer, such that the shielding part is disposed a position adjacent to the external side of the touch sensing layer, and the conducting part being disposed on the protecting substrate, and the hardening layer being covered onto the shielding part and the conducting portion, and having an open slot formed at a position near the hardening layer, so that a portion of the hardening layer and another portion of the hardening layer are separated by the open slot, and the open slot being disposed around the periphery of the touch sensing layer, and the open slot being disposed on an internal side of the shielding part, and the flat layer being covered onto the hardening layer, and the open slot; and a display module, disposed on the touch sensing layer.

Wherein, the touch sensing layer further includes a plurality of metal parts, and the conducting part includes a conducting layer and a plurality of conductive bridges, and the conducting part is disposed at an interface between the touch sensing layer and the protecting substrate, and each of the conductive bridges is disposed below the conducting layer, and a portion of the conducting layer is stacked onto the shielding part, and each of the metal parts is disposed on the shielding part, and a portion of each of the metal parts is stacked with the conducting layer disposed on the shielding part, and the hardening layer is further covered onto each of the metal parts, and the portion of the hardening layer is disposed on the shielding part, the conducting layer and each of the metal parts, and the other portion of the hardening layer is disposed on the conducting layer and each of the conductive bridges.

Wherein, the protecting substrate is a piece of cover lens, and the display module is a liquid crystal display module.

Wherein, the shielding part is a black matrix.

Wherein, the conducting part is made of a transparent conductive material.

Wherein, the conducting part is made of indium tin oxide (ITO).

Wherein, the conducting part is made of indium zinc oxide (IZO).

Wherein, the open slot has a width ranged from 50 μm to 200 μm.

Wherein, the touch sensing layer further includes a plurality of bridge layers, and each of the bridge layers is disposed between each of the conductive bridges and the conducting layer.

Wherein, each of the bridge layers is an optical adhesive layer, a hydrogel layer, an organic insulation layer or an inorganic insulation layer.

The touch module of the present invention has an open slot formed at a position near the hardening layer of the shielding part, no that a portion of the hardening layer is disposed on the shielding part, the conducting portion and the metal part, and another portion of the hardening layer is disposed on the conducting layer d the conductive bridge. As a result, the touch module will not have an uneven surface occuring at the stacking and bending positions of the hardening layer. When light is incident from the protecting substrate into the touch module, the mura phenomenon will not occur, so as to enhance the display effect of the touch module. In the present invention, the flat layer is covered onto the hardening layer and the open slot, so that when the touch module of the present invention is viewed, the pattern of the touch sensing layer is relatively mild, so as to improve the display effect of the touch module.

DESCRIPTION OF THE PREFERRED EMBODIMENTS

Figure 1:
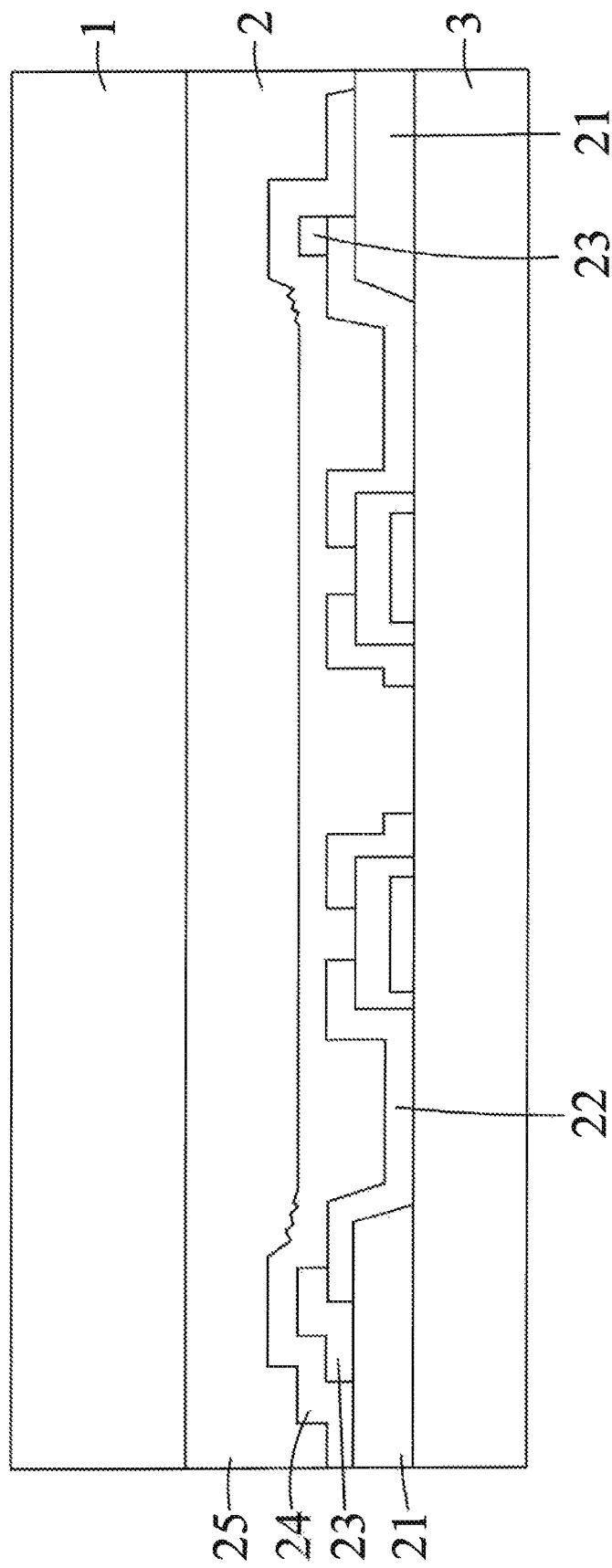
FIG. 1 is a cross-sectional side view of a conventional touch module.
Figure 2:
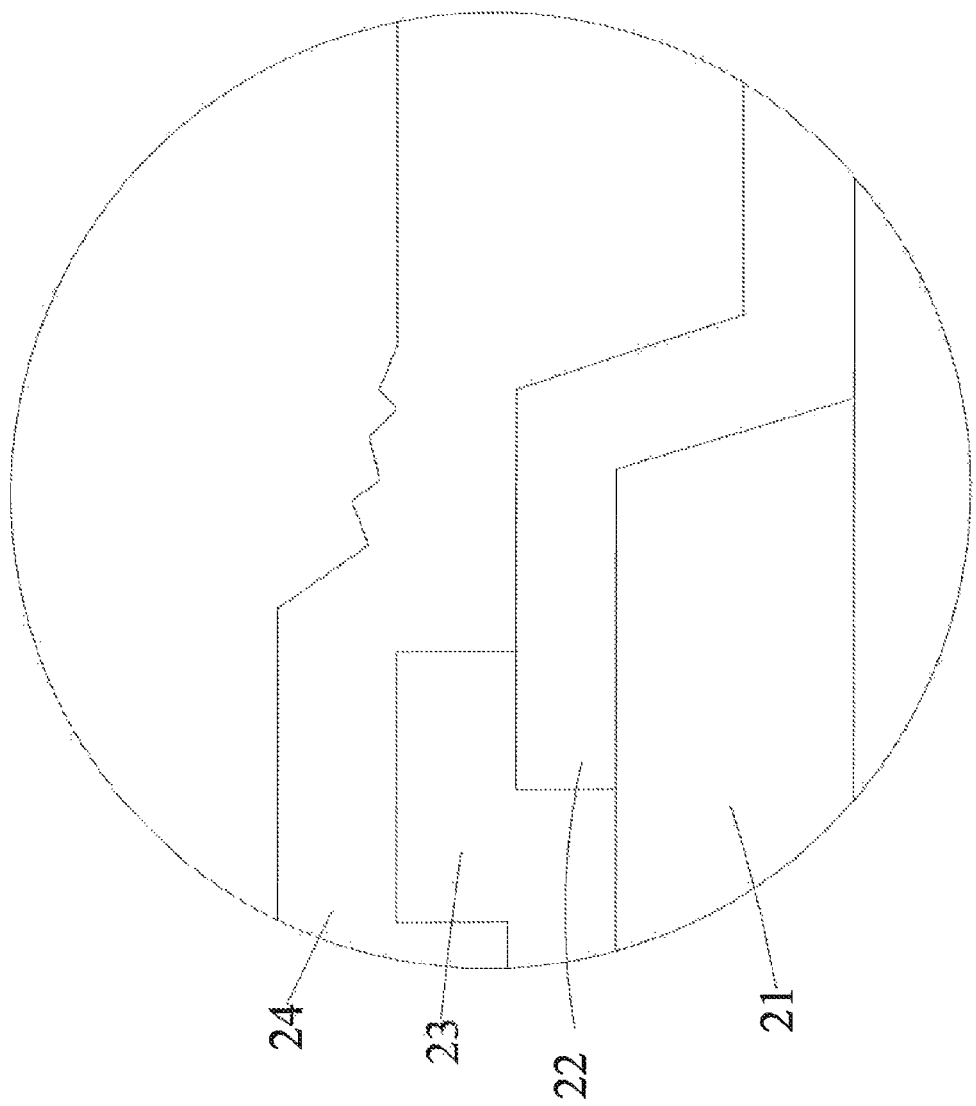
FIG. 2 is a blow-up view of a stack position on a side of a conventional touch module.

The technical characteristics of the present invention will become apparent with the detailed description of the preferred embodiments accompanied with the illustration of related drawings as follows. It is noteworthy that same numerals are used for representing the same respective elements in the drawings, and the drawings are provided for the purpose of illustrating the invention, but not intended for limiting the scope of the invention.

Figure 3:
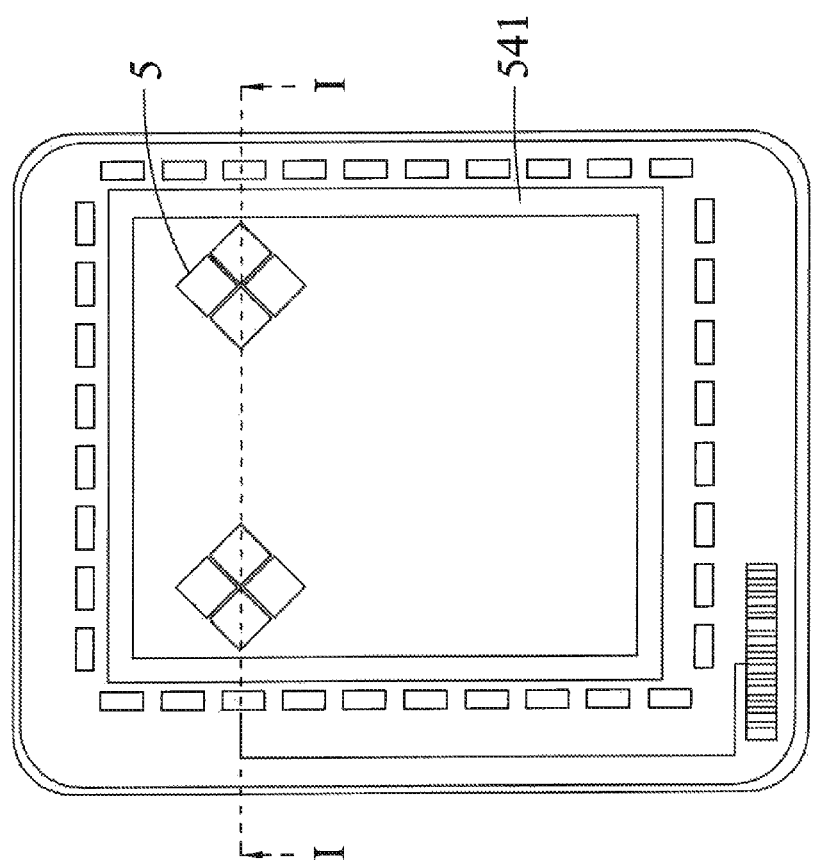
FIG. 3 is a top view of a touch module of the present invention.
Figure 4:
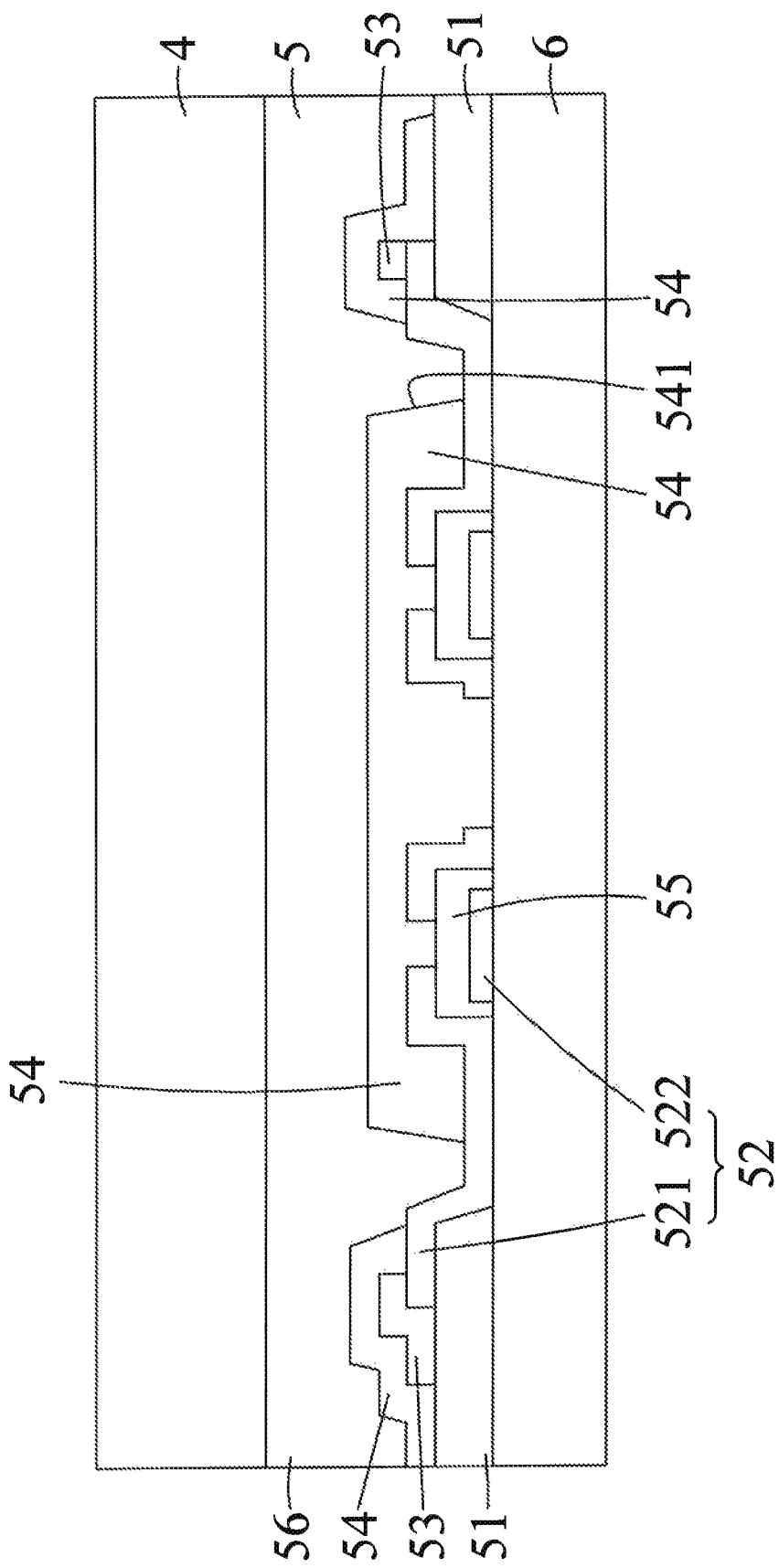
FIG. 4 is a cross-sectional side view top view of Section I-I of a touch module of the present invention as depicted in FIG. 3.

With reference to FIGS. 3 and 4 for a top view of a touch module of the present invention and a cross-sectional side view top view of Section I-I of a touch module of the present invention as depicted in FIG. 3 respectively, the touch module comprises a display module 4, a touch sensing layer 5 and a protecting substrate 6. The touch sensing layer 5 is disposed on the protecting substrate 6. The display module 4 is disposed on the touch sensing layer 5. Wherein, the protecting substrate 6 is a cover lens, and the display module 4 is a liquid crystal display module in this preferred embodiment.

The touch sensing layer 5 comprises a shielding part 51, a conducting part 52, a metal part 53, a hardening layer 54, a bridge layer 55 and a flat layer 56 (Optically Clear Adhesive, OCA). The conducting part 52 includes a conducting layer 521 and a plurality of conductive bridges 522. The shielding part 51 is disposed around the periphery of the touch sensing layer 5, so that the shielding part 51 surrounds the external periphery of the touch sensing layer 5. The conducting part 52 is disposed at an interface between the touch sensing layer 5 and the protecting substrate 6, so that the conducting part 52 can be disposed on the protecting substrate 6. Each conductive bridge 522 is disposed under the conducting layer. A bridge layer 55 is disposed between each conductive bridge 522 and the conducting layer 521. The bridge layer 55 can be an optical adhesive layer, a hydrogel layer, an organic insulation layer or an inorganic insulation layer. The shielding part 51 can be a black matrix. The conducting part 52 can be made of a transparent conductive material such as indium oxide (ITO) or indium zinc oxide (IZO).

A portion of conducting layer 521 is stacked on the shielding part 51. The metal part 53 is disposed on the shielding part 51, and a portion of metal part 53 is stacked on the conducting layer 521 of shielding part 51. The hardening layer 54 is covered onto the shielding part 51, the conducting layer 521 and the metal part 53 and the hardening layer 54 has an open slot 541 formed at a position near the shielding part 51, such that a portion of the hardening layer 54 is disposed on the shielding part 51, the conducting layer 521 and the metal part 53. Another portion of the hardening layer 54 is disposed on the conducting layer 521 and the conductive bridge 522. The aforementioned portion of the hardening layer 54 and the other portion of the hardening layer 54 are separated by the open slot 541. The open slot 541 is formed around the periphery of the touch sensing layer 5, and the open slot 541 is disposed on an internal side of the shielding part 51. The open slot 541 has a width falling ranged from 50 μm to 200 μm. The flat layer 56 is covered onto the hardening layer 54, and the open slot 541.

Figure 5:
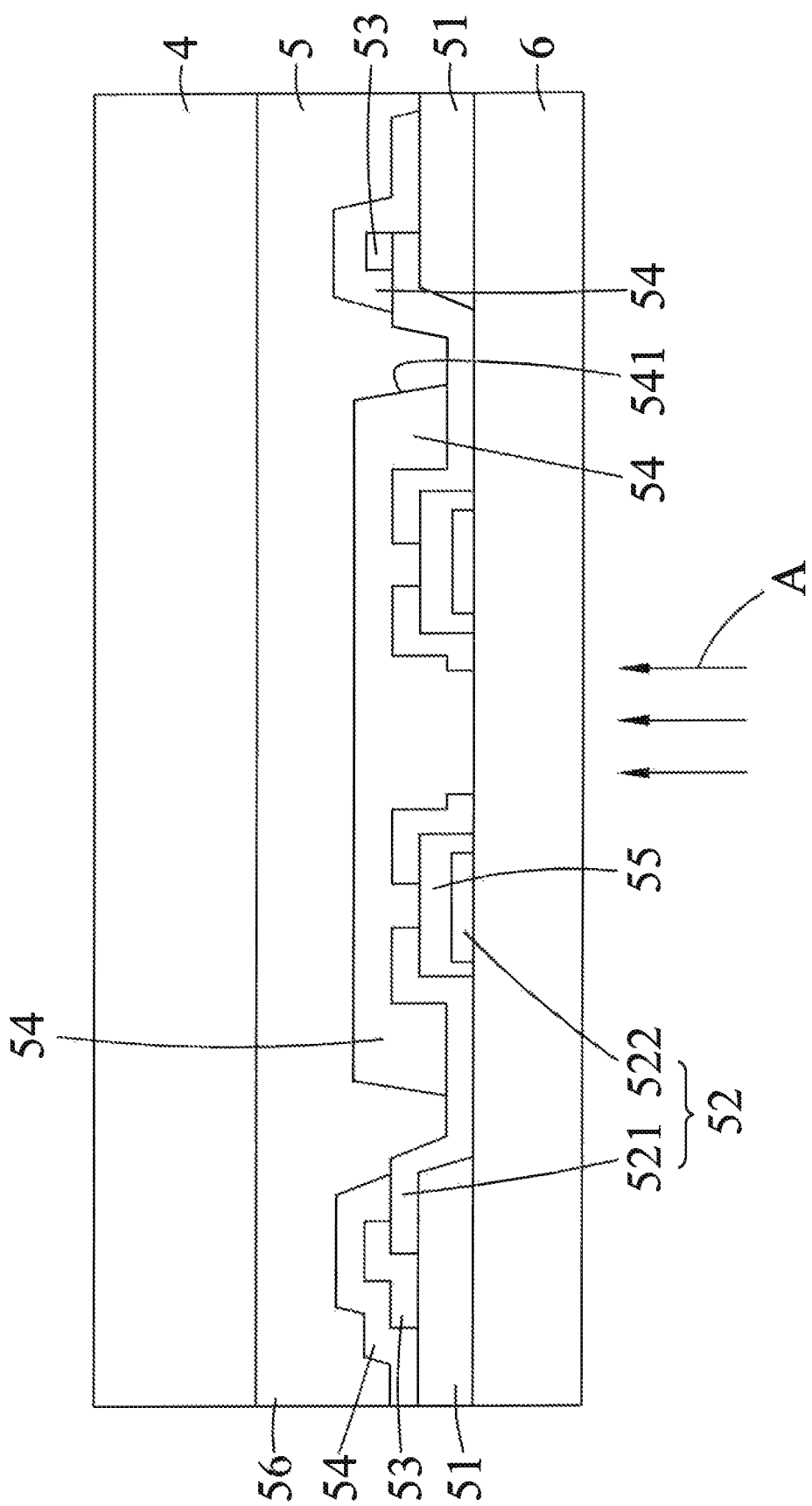
FIG. 5 is a schematic view of a light incident to a touch module of the present invention.

With reference to FIG. 5 for a schematic view of a light incident to a touch module of the present invention. Since the hardening layer 54 of the present invention has the open slot 541 formed at a position near the shielding part 51, so that a portion of the hardening layer 54 is disposed on the shielding part 51, the conducting layer 521 and the metal part 53, and another portion of the hardening layer 54 is disposed on the conducting layer 521 and the conductive bridge 522. An uneven surface will not occur at the stacking and bending positions of the surface of the hardening layer 54 on a side of the touch module. Therefore, when a light A is incident from the protecting substrate 6 into the touch module, the mura phenomenon will not occur, so as to enhance the display effect of the touch module. In the present invention, the flat layer 56 is covered onto the hardening layer 54 and the open slot 541, so that the touch module of the present invention has a pattern of the touch sensing layer 5 that is mild visually to enhance the display effect of the touch module.

Figure 6:
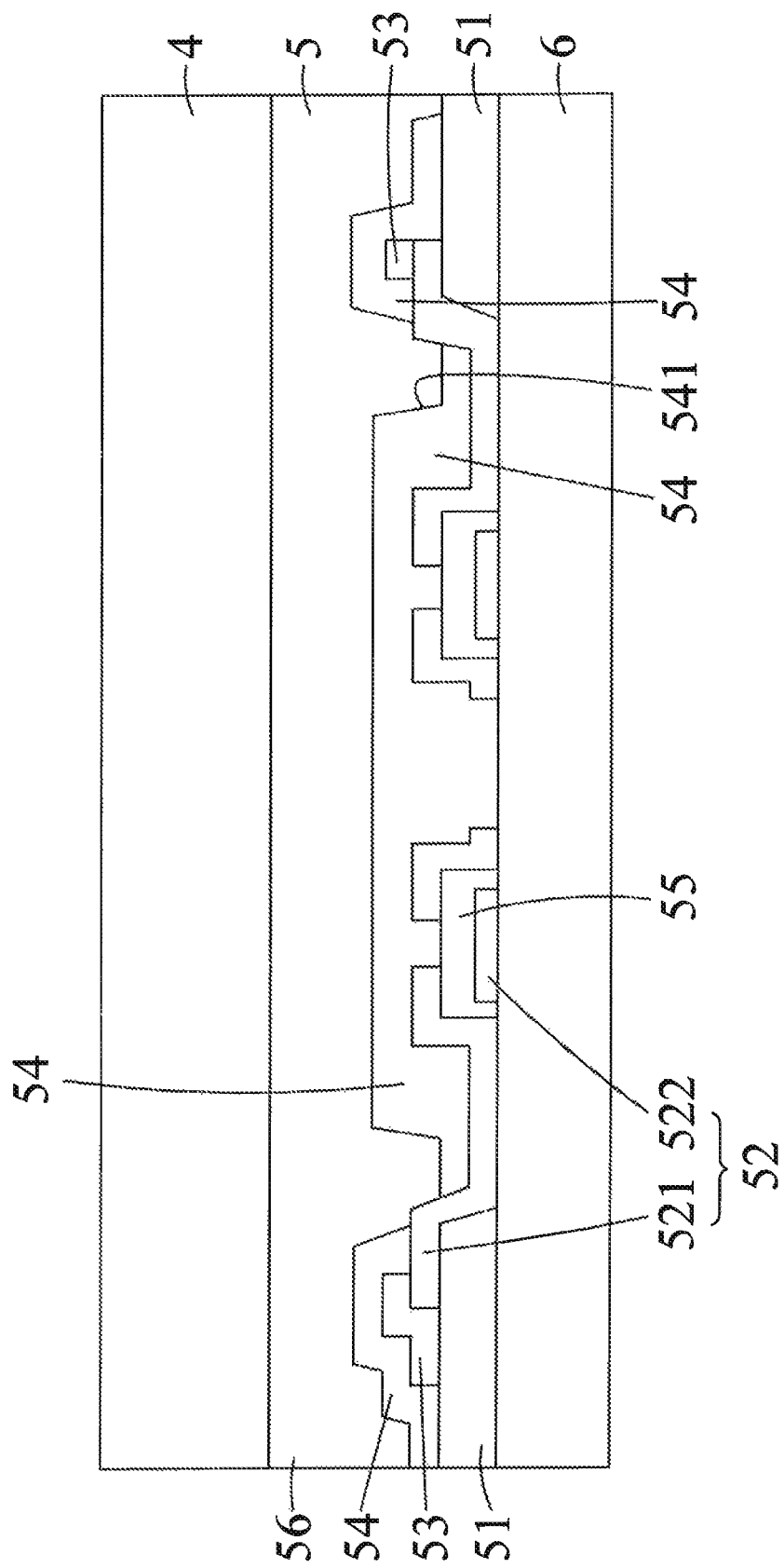
FIG. 6 is a cross-sectional side view of a touch module of the present invention.

With reference to FIG. 6 for a cross-sectional side view of a touch module of the present invention, it is noteworthy that the depth of the open slot 541 of the present invention can be controlled by the duration of the etching time. For example, a shorter etching time can be used for obtaining a shallower open slot 541 to increase the area of the conducting layer 521 to be covered by the hardening layer 54, so as to assure the stability of the properties of the conducting layer 521. The depth of the open slot 541 can be designed according to the actual requirements.

In summation of the description above, the touch module of the present invention has one or more of the following advantages:

1. The mura phenomenon will not occur to enhance the display effect of the touch module:

In the present invention, an open slot is formed on the hardening layer and at a position near the shielding part, so that a portion of the hardening layer is disposed on the shielding part, the conducting layer and the metal part, and another portion of the hardening layer is disposed on the conducting layer and the conductive bridge, and uneven surface will not occur on the hardening layer or at the stacking and bending positions of a side of the touch module. When a light is incident from the protecting substrate into touch module, a mura phenomenon will not occur, so as to enhance the display effect of the touch module.

2. The pattern of the touch sensing layer is mild visually to improve the display effect of the touch module:

In addition, the flat layer is covered onto the hardening layer and the open slot, so that pattern of the touch sensing layer is mild visually, so as to improve the visual effect of the display of the touch module.

While the invention has been described by means of specific embodiments, numerous modifications and variations could be made thereto by those skilled in the art without departing from the scope and spirit of the invention set forth in the claims.

What is claimed is:

1. A touch module, comprising:
a protecting substrate;
a touch sensing layer, disposed on the protecting substrate, and comprising a conducting part, a shielding part, a hardening layer and a flat layer, and the shielding part being disposed around the periphery of the touch sensing layer, such that the shielding part is disposed at a position adjacent to an external side of the touch sensing layer, and the conducting part being disposed on the protecting substrate, and the hardening layer covering the shielding part and the conducting portion, and the hardening layer having an open slot formed at a position near the shielding part, such that a portion of the hardening layer and another portion of the hardening layer are separated by the open slot, and the open slot being disposed around the periphery of the touch sensing layer, and the open slot being disposed on an internal side of the shielding part, and the flat layer covering the hardening layer and the open slot; and
a display module, disposed on the touch sensing layer.

2. The touch module of claim 1, wherein the touch sensing layer further includes a plurality of metal parts, and the conducting part includes a conducting layer and a plurality of conductive bridges, and the conducting part is disposed at an interface between the touch sensing layer and the protecting substrate, and each of the conductive bridges is disposed below the conducting layer, and a port on of the conducting layer is stacked onto the shielding part, and each of the metal parts is disposed on the shielding part, and a portion of each of the metal parts is stacked with the conducting layer disposed on the shielding part, and the hardening layer is further covered onto each of the metal parts, and the portion of the hardening layer is disposed on the shielding part, the conducting layer and each of the metal parts, and the other portion of the hardening layer is disposed on the conducting layer and each of the conductive bridges.

3. The touch module of claim 2, wherein the touch sensing layer further includes a plurality of bridge layers, and each of the bridge layers is disposed between each of the conductive bridges and the conducting layer.

4. The touch module of claim 1, wherein the protecting substrate is a piece of cover lens, and the display module is a liquid crystal display module.

5. The touch module of claim 1, wherein the shielding part is a black matrix.

6. The touch module of claim 1, wherein the conducting part is made of a transparent conductive material.

7. The touch module of claim 1, wherein the conducting part is made of indium tin oxide (ITO).

8. The touch module of claim 1, wherein the conducting part is made of indium zinc oxide (IZO).

9. The touch module of claim 1, wherein the open slot has a width ranged from 50 μm to 200 μm.

10. The touch module of claim 1, wherein each of the bridge layers is one selected from the collection of an optical adhesive layer, a hydrogel layer, an organic insulation layer and an inorganic insulation layer.

* * * * *